May 7, 1929.                M. W. HOWARD                1,711,734
                    HEEL BLANK BREASTING MACHINE
                 Filed Nov. 18, 1927      2 Sheets-Sheet 1
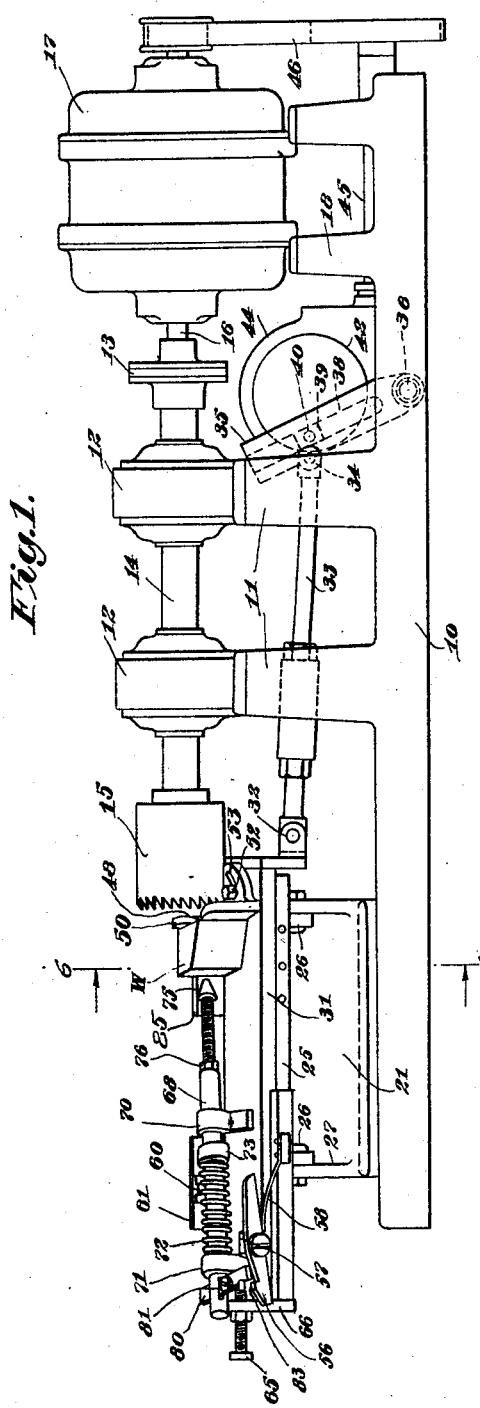
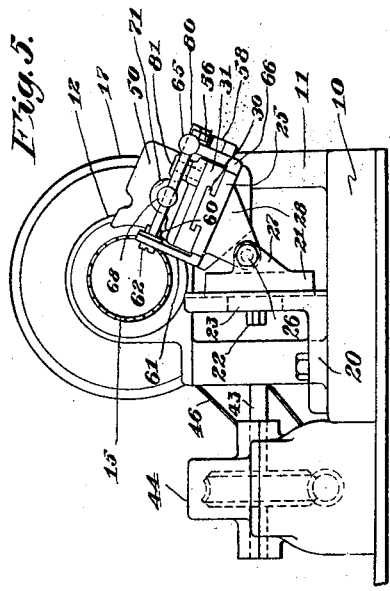
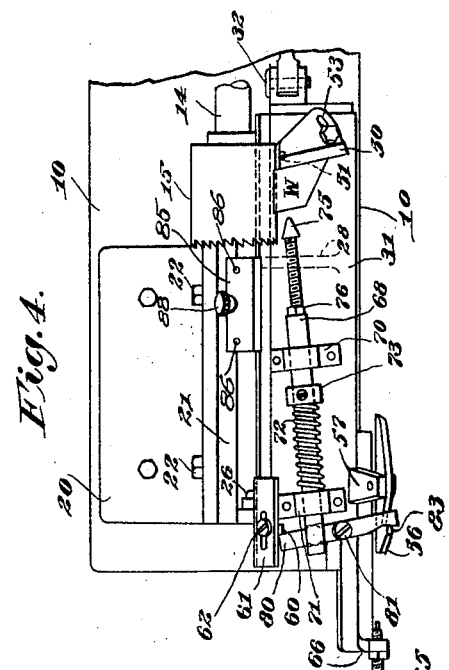
Inventor
Newton W. Howard
By Macleod, Calver, Copeland + Dike,
Attorneys

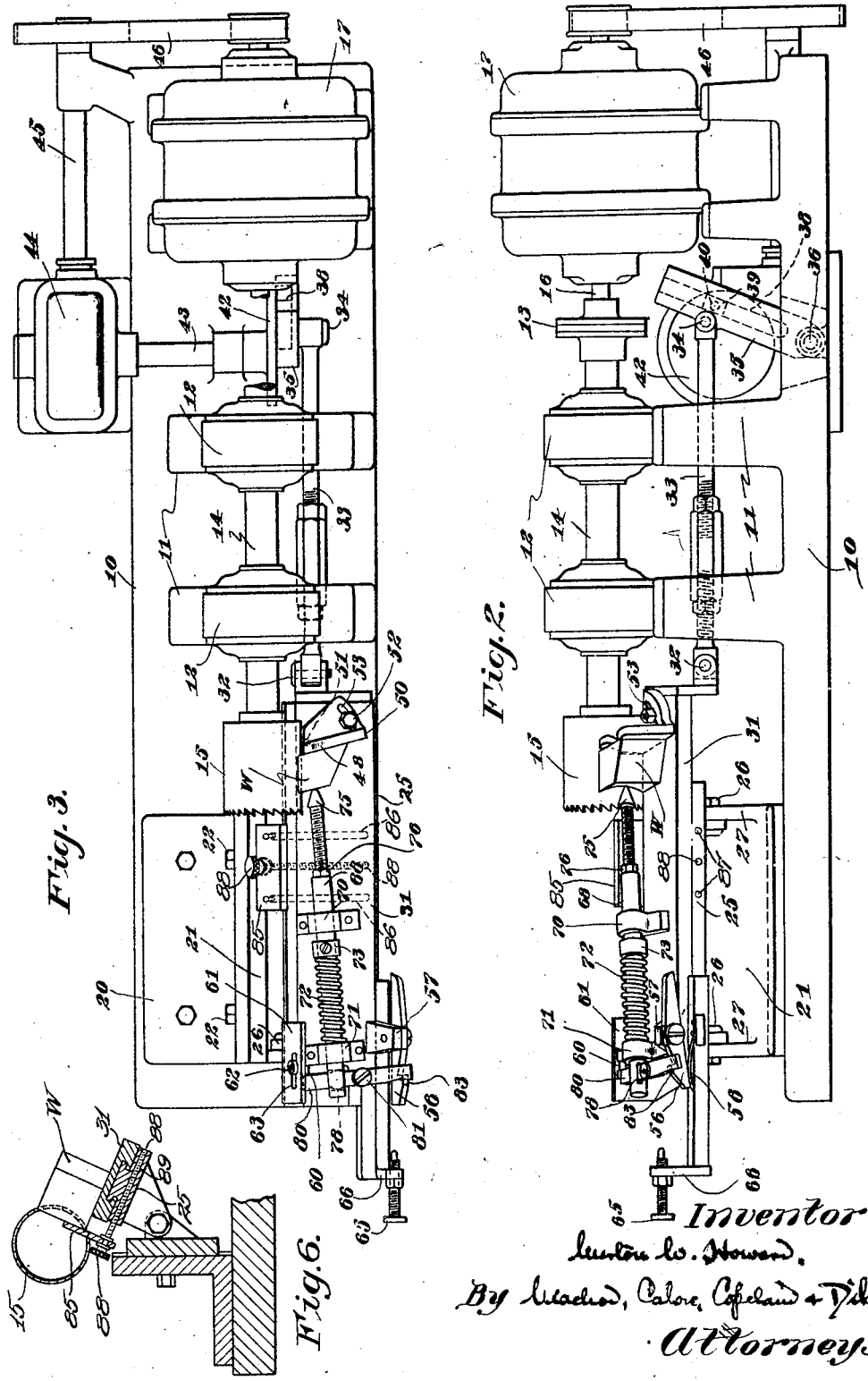

Patented May 7, 1929.

1,711,734

UNITED STATES PATENT OFFICE.

MERTON W. HOWARD, OF LYNN, MASSACHUSETTS, ASSIGNOR TO HOWARD DEVELOPMENT COMPANY, OF LYNN, MASSACHUSETTS, A CORPORATION OF MASSACHUSETTS.

HEEL-BLANK-BREASTING MACHINE.

Application filed November 18, 1927. Serial No. 234,264.

This invention relates to a heel breasting machine and has for its general object the provision of an improved heel breasting machine wherein the heel blank is held upon a work holder reciprocating past a cutter, such as a barrel saw, the arrangement being such that the blank may be roughly (or approximately) positioned upon the work holder manually and, in the course of the operation of the machine, automatically clamped and held in exact position for the breasting operation, fed onto the barrel saw or cutter and subsequently discharged, whereupon the work holder is returned to its work receiving position.

Before explaining the invention in detail, it is pointed out that the embodiment herein described is merely for the purpose of illustration and that the invention is not thereby limited except as pointed out by the claims appended hereto.

The invention will be more clearly understood from the following description, in conjunction with the accompanying drawings; in which, Fig. 1 is an elevational view of a heel breasting machine embodying the invention showing the work holder in work receiving position;

Fig. 2 is an elevational view of the same, showing the position of the work holder just before the blank is discharged;

Fig. 3 is a plan view of the same with the work holder in the position shown in Fig. 2;

Fig. 4 is a plan view of the machine showing the work holder in position to permit discharge of the work;

Fig. 5 is an end elevational view looking from the left of Fig. 1; and

Fig. 6 is a sectional view taken upon the line 6—6 of Fig. 1.

The machine illustrated comprises a base 10 provided with uprights 11 supporting bearings 12 for a rotatable shaft 14 upon one end of which a suitable cutter, such as a barrel saw 15, is secured. The shaft 14 is provided at its other end with a suitable coupling 13 for connecting it with the armature shaft 16 of a motor 17 suitably mounted upon uprights 18 integral with or otherwise appropriately secured to the base 10 of the machine.

In accordance with the invention, a movable work carrier is provided upon which a heel blank may be placed manually and, in the course of the operation of the machine, automatically clamped and held accurately in position for the breasting operation and subsequently discharged, whereupon the work holder is returned to its work receiving position. In the embodiment illustrated, the work carrier comprises a supporting angle bracket 20 suitably secured to the base of the machine. A plate 21 is adjustably mounted upon the angularly extending portion of the bracket 20 by bolts 22 threaded to the plate 21 and passing through slots 23 in the bracket. A plate 25 is mounted upon the plate 21 and may be held in any adjusted position relative thereto by clamping bolts 26 passing through suitable openings in lugs 27 and 28 upon plates 21 and 25, respectively. The plate 25 is provided with suitable guide-ways 30 for a slide or work holder 31. Preferably, the plate 25 is adjusted with the top surface of the slide 31 inclined to a horizontal plane so that the breasted blank may discharge by gravity. In order that the work holder 31 may be reciprocated past the cutter it is connected at one end by a pin 32 to one end of an adjustable connecting rod 33. The other end of the connecting rod 33 is pivotally connected by a pin 34 to an arm 35 mounted to swing about a stud 36 in the base of the machine. The arm 35 is provided with suitable ways 38 for a slide 39 which is pivotally mounted upon a stud 40 secured to a crank 42 mounted upon a shaft 43 and suitably connected through reduction gearing, generally indicated at 44 to shaft 45 and by a belt 46 to the driving motor 17.

A heel blank positioning plate 50 is pivotally mounted by a pin 51 to the slide 31 and may be secured in adjusted position to locate blanks of different shape properly relative to the cutter 15 by a clamping bolt 52 passing through a slot 53 in the positioning plate and having threaded engagement with the slide 31. Preferably, the plate 50 is provided with a notch 48 in its upper edge to provide clearness for the operator's finger when positioning a blank against the plate. A guide 85 is adjustably mounted upon the plate 25 and for this purpose, as illustrated, has pins 86 secured thereto adapted to enter apertures 87 in the plate 25 for sliding engagement therewith. An adjusting screw 88 is swiveled in the plate 85 for rotative movement therein and is adapted for engagement with a threaded opening 89 in the plate 25 whereby the position of the plate 85 may be adjusted relative to the plate 25. A pawl 56 is pivotally mounted upon an arm 57 projecting from the slide 31 and is positioned to be engaged by a spring 58 suitably secured upon the stationary plate 25. A block 60 is adjustably mounted upon a bracket 61 extending from the plate 25 by a screw 62 threaded to the block 60 and passing through a slot 63 in the bracket 61. A stop 65, such as a stop screw, is adjustably mounted in a bracket 66 extending upwardly from one end of the plate 25. The heel blank W may be clamped and held during the breasting operation in any suitable manner and for this purpose, as illustrated, a plunger 68 is mounted for longitudinal movement in guides 70 and 71 upon the slide 31. The plunger 68 is pressed towards the right as viewed in Fig. 1 to clamp the heel blank W against the plate 50 by a spring 72 surrounding the plunger and extending between the guide 71 and a collar 73 fixed upon the plunger. One end of the plunger 68 is adjustable and for this purpose is provided with a threaded opening to receive an adjustable work engaging member 75, which may be locked in adjusted position upon the plunger by a lock nut 76 engaging the end of the plunger. A slot 78 is provided in the plunger 68 near its other end through which passes a lever 80 pivoted to turn about a bolt 81 in the slide 31. Preferably, the portion of the lever 80 within the slot 78 is provided with a convex edge. One end of the lever 80 is extended so that it may be engaged by the block 60 as the slide 31 approaches one end of its stroke, while the other end of the lever 80 is extended to be engaged by the stop 65 as the slide 31 approaches the other end of its stroke and also to be engaged by the pawl 56 when the hook end 83 thereof is pressed into the path of the lever 80 by the spring 58.

In the operation of the machine, the motor is started causing rotation of the cutter or barrel saw 15 and simultaneous reciprocation of the slide 31. When the slide 31 approaches the end of its stroke towards the left, as viewed in Fig. 1, the lever 80 is brought into engagement with the stop 65, thereby turning the lever and retracting the plunger 68 against the action of the spring 72. When the plunger is thus retracted and the plate 50 brought adjacent the plate 85, as shown in Fig. 1, a heel blank may be manually positioned upon the slide 31 against the positioning plate 50 and guide plate 85. It will be understood that the position of the plate 85 will have been adjusted previously relative to plate 25 an amount depending upon the depth of cut or amount of stock it is desired to remove from the breast of the heel. In the course of the operation of the machine, the slide 31 then moves toward the right, as viewed in Fig. 1 thereby moving the lever 80 away from the stop 65 and permitting the spring 72 to press the plunger 68 against the heel blank W and hold the same in proper position against the plate 50 during the breasting operation. Further movement of the slide 31 causes the heel blank W to be moved past the cutter 15 and become properly shaped. Thereafter, the opposite end of the lever 80 strikes against the block 60 to turn the lever about its pivot and retract the plunger, (as shown in Fig. 4) thereby permitting discharge of the heel blank W by gravity down the inclined surface of the slide 31. By this time the pawl 56 has moved to a position permitting the hook end 83 of the pawl to be moved by the spring 58 into engagement with the end of the lever 80, thereby holding the plunger 68 in its retracted position as the slide 31 returns to its work receiving position.

What I claim is:

1. In a heel breasting machine, in combination, a revoluble cutter, a movable heel blank holder, means for reciprocating said holder past said cutter and into separate, spaced work-receiving and work-discharging positions, a clamp for holding a blank upon said holder, and devices for automatically operating said clamp a plurality of times during each complete reciprocation of said work holder when the latter is substantially in its work-receiving and work-discharging positions respectively.

2. In a heel breasting machine, in combination, a revoluble cutter, a movable heel blank holder, means for reciprocating said holder past said cutter and into separate, spaced work-receiving and work-discharging positions, a clamp for holding a blank upon said holder, and devices for automatically opening said clamp when said holder is brought to the work-discharging position and for closing the same when said holder is substantially in the work-receiving position.

3. In a heel breasting machine, in combination, a revoluble cutter, a movable heel blank holder, means for reciprocating said holder past said cutter, a clamp for holding said blank upon said holder, means for releasing said clamp during the movement of said holder and after the breasting operation to permit discharge of the blank, and means for bringing said clamp to its released position while said holder is in work-receiving position but permitting said clamp to engage said blank as said holder is moved towards said cutter.

4. In a heel breasting machine, in combination, a revoluble cutter, a movable heel blank holder, a plate on said holder for positioning the blank, means for reciprocating said holder past said cutter, a clamp adapted to hold the blank against said plate during the breasting operation, and means for releasing said clamp as said holder approaches each end of its stroke to permit discharge and replacement of said blank.

5. In a heel breasting machine, in combination, a revoluble cutter, a movable heel blank holder, a plate on said holder for positioning the blank, means for reciprocating said holder past said cutter, a spring pressed plunger adapted to hold the blank against said plate during the breasting operation, and means for retracting said plunger as said holder approaches each end of the stroke to permit discharge and replacement of said blank.

6. In a heel breasting machine, in combination, a revoluble cutter, a movable heel blank holder, a positioning plate thereon, means for reciprocating said holder past said cutter, a spring pressed plunger mounted on said holder adapted to hold the blank against said plate for the breasting operation, and means for retracting said plunger when said holder is in work receiving position but release the same to permit said spring to move the plunger and press the blank against said plate as said holder moves toward said cutter.

7. In a heel breasting machine, in combination, a revoluble cutter, a movable heel blank holder, a plate on said holder for positioning the blank, means for reciprocating said holder past said cutter, a spring pressed plunger adapted to hold the blank against said plate during the breasting operation, and means for retracting said plunger during the movement of said plate and after the breasting operation to permit discharge of the blank.

8. In a heel breasting machine, in combination, a revoluble cutter, a movable heel blank holder, a plate on said holder for positioning the blank, means for reciprocating said holder past said cutter, a spring pressed plunger adapted to hold the blank against said plate during the breasting operation, means for retracting said plunger during the movement of said plate and after the breasting operation to permit discharge of the blank, and means for holding said plunger in its retracted position as said holder is returned to its work receiving position.

9. In a heel breasting machine, in combination, a revoluble cutter, a movable heel blank holder, a plate on said holder for positioning the blank, means for reciprocating said holder past said cutter, an adjustable spring pressed plunger adapted to hold said blank against said plate during the breasting operation, a lever pivoted to said holder and passing through said plunger, and an adjustable stop adapted to engage the end of said lever as said holder approaches each end of its stroke and retract said plunger against the action of said spring.

10. In a heel breasting machine, in combination, a revoluble cutter, a movable heel blank holder, a plate for positioning the blank, means for reciprocating said holder past said cutter, a spring pressed plunger adapted to hold said blank against said plate during the breasting operation, a lever pivoted to said holder and passing through said plunger, a stop adapted to engage the end of said lever as said holder approaches each end of its stroke and retract said plunger, a pivoted pawl, and means for moving said pawl to hold the end of said lever at one end of the stroke of said holder and release said lever at the other end of the stroke of said holder.

In testimony whereof I affix my signature.

MERTON W. HOWARD.